United States Patent
Sinha et al.

(10) Patent No.: US 10,088,590 B2
(45) Date of Patent: Oct. 2, 2018

(54) METHODS FOR MEASURING PROPERTIES OF MULTIPHASE OIL-WATER-GAS MIXTURES

(71) Applicants: Los Alamos National Security, LLC, Los Alamos, NM (US); Dipen N. Sinha, Los Alamos, NM (US); Anirban Chaudhuri, Los Alamos, NM (US); Cristian Pantea, Los Alamos, NM (US)

(72) Inventors: Dipen N. Sinha, Los Alamos, NM (US); Anirban Chaudhuri, Los Alamos, NM (US); Cristian Pantea, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 71 days.

(21) Appl. No.: 14/782,090

(22) PCT Filed: Apr. 4, 2014

(86) PCT No.: PCT/US2014/033097
§ 371 (c)(1),
(2) Date: Oct. 2, 2015

(87) PCT Pub. No.: WO2014/164833
PCT Pub. Date: Oct. 9, 2014

(65) Prior Publication Data
US 2016/0041286 A1    Feb. 11, 2016

Related U.S. Application Data

(60) Provisional application No. 61/808,620, filed on Apr. 4, 2013.

(51) Int. Cl.
*G01V 1/44* (2006.01)
*G01F 1/66* (2006.01)
(Continued)

(52) U.S. Cl.
CPC .............. *G01V 1/44* (2013.01); *E21B 49/087* (2013.01); *G01F 1/667* (2013.01); *G01F 1/668* (2013.01); *G01F 1/74* (2013.01)

(58) Field of Classification Search
CPC .. G01F 1/667–1/668; G01F 1/74; G01V 1/44; E21B 49/087
See application file for complete search history.

(56) References Cited

U.S. PATENT DOCUMENTS

| 4,112,735 A | 9/1978 | McKnight |
| 4,759,775 A * | 7/1988 | Peterson ................. A61M 1/36 210/188 |

(Continued)

FOREIGN PATENT DOCUMENTS

| CN | 1912612 A | 2/2007 |
| CN | 1912612 A | 2/2007 |
| RU | 2096812 | 11/1997 |

OTHER PUBLICATIONS

International Searching Authority, International Search Report, dated Nov. 7, 2014, pp. 1-11, PCT/US14/33097.
(Continued)

*Primary Examiner* — John Fitzgerald
(74) *Attorney, Agent, or Firm* — Samuel M. Freund; Cochran Freund & Young LLC

(57) ABSTRACT

Methods for real-time, continuous measurements of the composition and other properties of individual phases of petroleum, water and gas mixtures during the oil production process, without requiring test separators, test lines, with associated valving and instrumentation, are described. Embodiments of the present invention direct ultrasonic sound transmission through a flowing multiphase fluid in three frequency ranges: low frequencies, gas bubble resonance frequencies, and high frequencies, wherein certain sound propagation measurements, including sound speed, (Continued)

sound attenuation and sound scattering, are made in one or more of the three separate frequency regions, from which the multiphase composition and other properties are extracted without having to separate the multiphase fluid or the gas from the flowing stream.

8 Claims, 17 Drawing Sheets

(51) Int. Cl.
    *G01F 1/74* (2006.01)
    *E21B 49/08* (2006.01)

(56) References Cited

U.S. PATENT DOCUMENTS

| | | | | |
|---|---|---|---|---|
| 4,983,189 | A * | 1/1991 | Peterson | A61M 1/36 210/188 |
| 6,644,118 | B2 * | 11/2003 | Kaduchak | B01D 49/006 210/748.05 |
| 7,010,962 | B2 | 3/2006 | Sinha | |
| 7,437,946 | B2 | 10/2008 | Gysling | |
| 7,607,358 | B2 * | 10/2009 | Atkinson | G01F 1/34 73/861.12 |
| 7,718,073 | B2 * | 5/2010 | Cordemans de Meulenaer | A61K 41/0014 128/898 |
| 7,954,362 | B2 * | 6/2011 | Hurmuzlu | G01F 1/74 73/61.44 |
| 8,061,186 | B2 * | 11/2011 | Gysling | G01N 29/024 73/61.54 |
| 8,097,170 | B2 * | 1/2012 | de Meulenaer | A61K 41/0014 210/748.03 |
| 8,176,796 | B2 * | 5/2012 | Hurmuzlu | G01F 1/74 73/861.44 |
| 8,322,228 | B2 * | 12/2012 | Xie | G01F 1/36 73/861.04 |
| 8,408,049 | B2 * | 4/2013 | Hurmuzlu | G01F 1/74 73/61.44 |
| 8,555,729 | B2 * | 10/2013 | Xie | G01F 1/36 73/861.04 |
| 8,820,147 | B2 * | 9/2014 | Sinha | G01N 29/024 73/61.79 |
| 2003/0164038 | A1 | 9/2003 | Han et al. | |
| 2007/0269876 | A1 * | 11/2007 | Cordemans de Meulenaer | A61K 41/0014 435/173.9 |
| 2008/0319685 | A1 * | 12/2008 | Xie | G01N 22/00 702/45 |
| 2009/0025460 | A1 * | 1/2009 | Hurmuzlu | G01F 1/74 73/61.45 |
| 2009/0158823 | A1 * | 6/2009 | Kaduchak | G01N 15/1404 73/61.75 |
| 2009/0229375 | A1 * | 9/2009 | Atkinson | G01F 1/34 73/861.18 |
| 2009/0241672 | A1 * | 10/2009 | Gysling | G01N 29/024 73/597 |
| 2010/0107727 | A1 | 5/2010 | Gysling | |
| 2010/0268487 | A1 * | 10/2010 | Hurmuzlu | G01F 1/74 702/48 |
| 2010/0274503 | A1 * | 10/2010 | Hurmuzlu | G01F 1/74 702/48 |
| 2011/0138928 | A1 * | 6/2011 | Xie | G01F 1/36 73/861.04 |
| 2011/0154890 | A1 * | 6/2011 | Holm | B01D 21/283 73/61.75 |
| 2011/0284475 | A1 * | 11/2011 | Kolodny | C02F 1/004 210/748.02 |
| 2012/0055239 | A1 | 3/2012 | Sinha | |
| 2012/0055252 | A1 | 3/2012 | Sinha | |
| 2013/0047709 | A1 | 2/2013 | Xie et al. | |

OTHER PUBLICATIONS

Chinese patent application No. 201480028926.X Office Action dated Sep. 1, 2017, eight total pages.
Russian Office Action for patent application No. 2015147186/28(072621) dated Dec. 21, 2017, twelve total pages.

* cited by examiner

METHODS FOR MEASURING PROPERTIES OF MULTIPHASE OIL-WATER-GAS MIXTURES

CROSS-REFERENCE TO RELATED APPLICATIONS

The present application claims the benefit of U.S. Provisional Patent Application No. 61/808,620 for "Apparatus And Method For Measurement Of Multiphase Oil And Gas Composition", which was filed on Apr. 4, 2013, the entire contents of which application is hereby specifically incorporated by reference herein for all that it discloses and teaches.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to the measurement of the composition of individual phases of petroleum, water and gas mixtures and, more particularly, to providing real time, continuous data for the composition of individual phases of petroleum, water and gas mixtures during the oil production process, without requiring test separators, test lines, with associated valving and instrumentation.

BACKGROUND

Measurements of the individual phase composition of petroleum, water and gas mixtures produced during oil production processes are used in well testing, well management, and production allocation. Conventional measuring devices for two and three-phase metering systems require expensive and cumbersome test separators, test lines, associated valving and instrumentation controls, safety systems and metering, especially for offshore/subsea wells and other installations, which require high maintenance, and field personnel intervention. Test separators may introduce environmental problems as well. Current approaches to multiphase metering are expensive and, consequently, meters are rarely used on a single well, but rather on a group of wells that route their productions to gauging stations with large manifolds to accommodate many wells. Each well is tested sequentially for a brief period of time. In some oil fields, produced multiphase fluid is first passed through a cyclone type of gas-liquid separator before directing the liquid to an oil-water measuring system. There are many instruments available to make two-phase (oil-water) composition measurements that include capacitive, microwave, Coriolis, and ultrasonic measurements. There is presently no commercially available, inexpensive and reliable instrument suitable for single well testing.

SUMMARY OF THE INVENTION

Embodiments of the present invention overcome the disadvantages and limitations of the prior art by providing a method for generating real-time well data for the composition of individual phases of petroleum, water and gas mixtures during the oil production process.

Another object of embodiments of the invention is to provide a method for generating continuous data for the composition of individual phases of petroleum, water and gas mixtures during the oil production process.

Yet another object of embodiments of the invention is to provide a method for generating real-time, continuous well data for the composition of individual phases of petroleum, water and gas mixtures during the oil production process, without requiring test separators, test lines, and associated valving and instrumentation.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the method for determining the gas volume fraction of a mixture of gas bubbles having a range of sizes, and a fluid in a pipe or other container having a wall with an inner surface defining a cavity, hereof, includes: applying pulsed oscillatory acoustic energy to the wall of the pipe or container such that an acoustic pulse is transmitted through the mixture, and wherein the wavelength of the oscillatory acoustic energy in the mixture is greater than or equal to about 5 times the size of a bubble; receiving pulsed acoustic energy arriving at the wall of the pipe or container; and measuring the time of flight of the pulsed acoustic energy through the mixture from which sound speed of the pulsed acoustic energy is determined; whereby the gas volume fraction of the mixture is calculated.

In another aspect of the invention and in accordance with its objects and purposes, the method for determining the composition of an oil-water mixture in a gas-water-oil mixture in a pipe or other container having a wall with an inner surface defining a cavity, hereof, includes: applying pulsed oscillatory acoustic energy to the wall of the pipe or container such that an acoustic pulse is transmitted through the mixture, and wherein the lowest frequency of the oscillatory acoustic energy in the gas-water-oil mixture is greater than 500 kHz; receiving pulsed acoustic energy arriving at the wall of the pipe or container; and measuring the time of flight of the pulsed acoustic energy through the mixture from which sound speed of the pulsed acoustic energy is determined; whereby the gas volume fraction of the mixture is calculated.

In yet another aspect of the invention and in accordance with its objects and purposes, the method for measuring the distribution of bubble sizes in a mixture of gas bubbles having a distribution of sizes, and a fluid in a pipe or other container having wall with an inner surface defining a cavity, hereof, includes: applying broadband pulsed oscillatory acoustic energy to the wall of the pipe or container such that pulsed acoustic energy is transmitted into the mixture, and wherein the frequency range of the broadband oscillatory acoustic energy is within the range of bubble resonance frequencies; receiving pulsed acoustic energy scattered by the bubbles; extracting Doppler signals from the scattered acoustic energy; and measuring the intensity of the Doppler signals from which the distribution of bubble sizes is determined.

In still another aspect of the invention and in accordance with its objects and purposes, the method for measuring the distribution of bubble flow rates in a mixture of gas bubbles having a distribution of sizes, and a fluid in a pipe or other container having wall with an inner surface defining a cavity, hereof, includes: applying broadband pulsed oscillatory acoustic energy to the wall of the pipe or container such that pulsed acoustic energy is transmitted into the mixture, and wherein the frequency range of the broadband oscillatory acoustic energy is within the range of bubble resonance frequencies; receiving pulsed acoustic energy scattered by the bubbles; and determining the Doppler frequency shifts from the scattered acoustic energy; from which the distribution of bubble flow rates is determined.

Benefits and advantages of embodiments of the present invention include, but are not limited to, providing an apparatus and method for generating real-time, continuous data for the composition of individual phases of petroleum, water and gas mixtures during the oil production process, without having to separate the gas from the flowing stream, thereby improving reservoir management and lowering the cost of operation of any oil field.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1 is a graph of the speed of sound as a function of frequency for a liquid containing a 1% volume fraction of monodisperse 20 μm bubbles, illustrating low frequencies, gas bubble resonance frequencies, and high frequencies, while FIG. 1b is a graph of the sound attenuation of the bubble-containing liquid described for FIG. 1a, hereof, as a function of frequency.

FIG. 16a is a schematic representation of a noninvasive attachment of transducers to a pipe, while

FIG. 19a is a schematic representation of an apparatus using acoustic radiation pressure generated from a cylindrical piezoelectric tube at the breathing mode frequency of the tube for moving the bubbles entrained in the water/petroleum mixture such that the cavity resonance shifts, while

DETAILED DESCRIPTION

Figure 1:
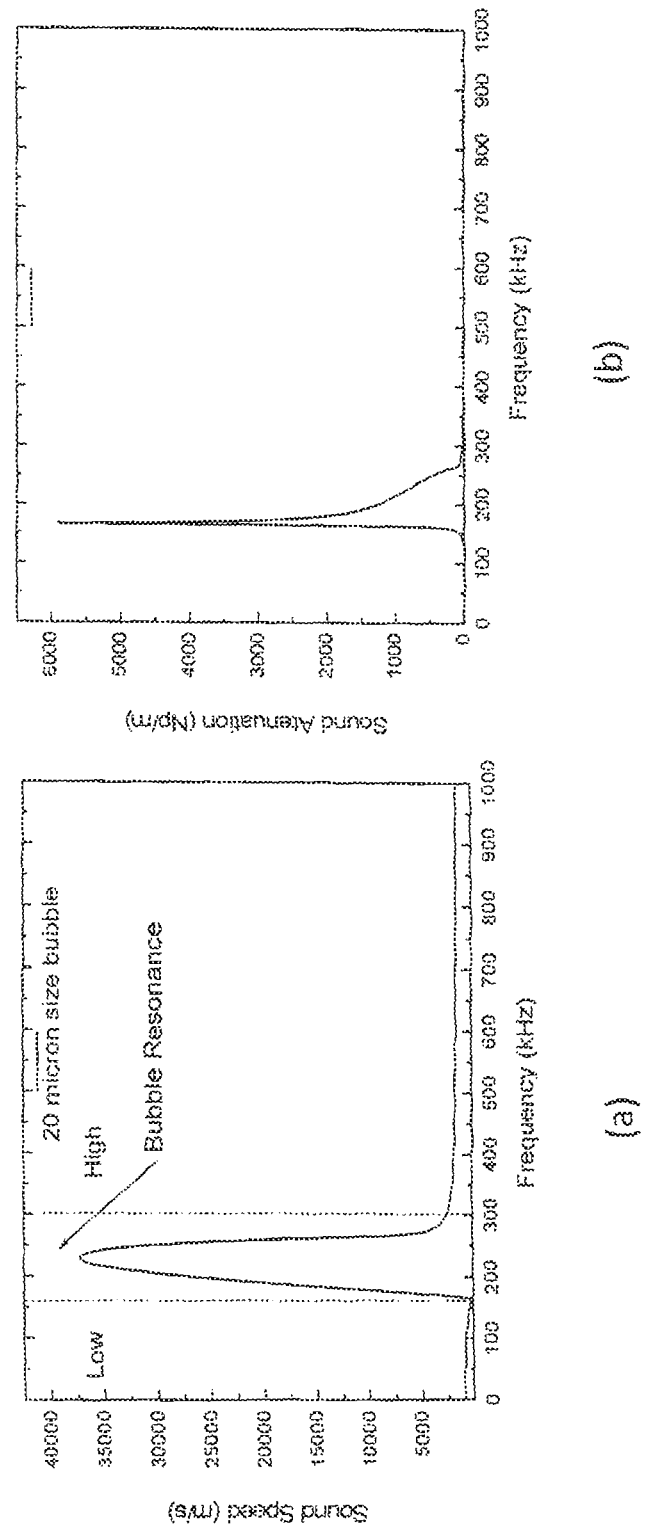

A multiphase meter (MPM) is a device used in the oil and gas industry to measure the individual phase composition of petroleum, water and gas mixtures produced during the oil production process. The primary use of these meters is in well testing, well management, and production allocation. These meters eliminate the need for test separators, test lines, associated valving and associated instrument controls, safety systems and metering, and maintenance/testing, especially for offshore/subsea pipes and installations. MPMs generate real-time, continuous well data, which can provide detailed well information—like water breakthrough, etc., in order to optimize well performance. Presently, there are no commercially available MPMs that are sufficiently accurate and inexpensive, such that they can be used on single wells for continuous testing.

The difficulty in making such measurements is the presence of gas in the mixture during the composition measurement. It is also desirable to determine the volume of gas; therefore, separating the gas from the flow stream is not cost-effective. Commercially available meters used for two-phase measurements cannot tolerate the presence of any gas, or produce erratic results if the gas volume fraction exceeds a few percent. The present apparatus and method permits the measurement of the amount of gas in a flowing multiphase liquid volume without having to separate either the multiphase liquid or the gas from the flowing stream.

Embodiments of the present invention direct ultrasonic sound transmission through a flowing multiphase fluid at three frequency ranges: low frequencies, gas bubble resonance frequencies, and high frequencies, wherein certain sound propagation measurements, including sound speed, sound attenuation and sound scattering, are made in one or more of the three separate frequency regions from which the multiphase composition is extracted. Most ultrasonic based instruments work at a fixed frequency which omits their operation to a restricted gas volume or bubble size distribution present in the fluid. Additionally, as stated hereinabove, most instruments cannot operate with high sound attenuation as a consequence of the presence of the gas bubbles.

The low-frequency region uses frequencies less than or equal to about 25 kHz, which are below the bubble resonances for bubbly fluids in the oil-gas industry. At such low frequencies, the wavelengths of sound are much larger than the largest bubble size, and for these large wavelengths the mixture behaves as medium with an effective sound speed that is a combination of those for the fluid and the gas. Fine details, such as bubble size, are not detected. Low frequencies measurements can be made using with sine wave bursts, frequency chirps, or bursts of white noise in the correct frequency range. Average values of sound speed and density for the fluid are all that is necessary and no calibration of the fluid is required for the measurement. A calibration is only needed if the quantity of gas is very low. For gas volume fractions (GVFs) higher than 10%, the error introduced is less than 5%. However, a calibration can be used to improve the accuracy.

The second range is the bubble resonance frequency region. Different bubble sizes have different resonance frequencies. This may be measured using a frequency chirp technique, such that the entire bubble distribution (in size and quantity) can be detected in a single measurement. Both transmitted signal and scattered signal are measured. The scattered signal includes peaks corresponding to bubble resonances, while the transmitted signal includes corresponding drops in amplitude (for increases in the scattered signal). If there are too many bubbles or gas, the attenuation can be so high that no sound is transmitted; in that situation, the scattered signal provides a measurement. A combination of the two data sets, then, provides a more accurate measurement. These measurements may be made at rates as high 100 times a second with each measurement providing a snapshot of the bubble volume at any given instant of time. If the measurements are integrated over time, a gas volume fraction in a column of bubbly fluid may be obtained.

By combining the low-frequency, and the bubble resonance frequency measurements, one can extract a reliable measurement of the GVF. For example, in slug flow situations, where large amount of gas flows through suddenly in bursts, the bubble resonance measurements may not provide accurate measurements, the low frequency measurements are used.

The third frequency range is the high-frequency range where the liquid-liquid (oil-water) composition may be determined. This composition is also needed for the low-frequency measurement for converting sound speed to volume fraction data. In a separate section of the pipe made slightly oval shaped (oblate, with 1-3% eccentricity), transducers are used to produce sufficient acoustic radiation force inside a pipe or other container to move the bubbles for providing a bubble-free path between a transmitter transducer and a receiver transducer across the pipe. Different amounts of force concentration are obtained using different amounts of eccentricity. A value is chosen that provides a clear path through the liquid as shown. A calibration is needed to obtain accurate oil-water compositions.

The GVF is also needed to correct for slip in the measurement. For example, gas bubbles will flow regardless of whether the liquid is flowing or not; that is, the gas can slip through the liquid. Many flow measurement devices require the slip rate to correct for the actual liquid flow. The slip rate or velocity varies with the GVF. Above about 50% GVF, the slip rate can become very large as the dominant medium is gas. There are theoretical models that relate GVF and the slip velocity in a system.

FIG. 1$a$ is a graph of the speed of sound as a function of frequency for a liquid containing a 1% volume fraction of monodisperse 20 µm bubbles, illustrating the three frequency ranges mentioned hereinabove, while FIG. 1$b$ is a graph of the sound attenuation of the bubble-containing liquid described in FIG. 1$a$, hereof, as a function of frequency. It may be observed that in the bubble resonance region, both sound speed and sound attenuation increase by orders of magnitude. The high frequency region behavior is essentially flat with frequency. At low frequencies, where the wavelength of sound is significantly greater than the size of any gas bubbles (greater than or equal to about 5 times of the bubble size) in the liquid, the medium can be treated as a uniform medium with certain effective properties (e.g., density, elasticity etc.), because the finer details in the inhomogeneity of the fluid due the presence of bubbles are lost (smeared out). Here elasticity implies compressibility of the bubbly medium. Throughout, bubble size refers to the largest linear dimension or width of the bubble.

The sound velocity of a liquid-air (e.g., water-gas) mixture can be calculated by using average elasticity and density. Let $\rho_w E_w$ and $\rho_a E_a$ represent the density and elasticity of the constituents water and air, respectively, indicated by the subscripts w and a. Let $\phi$ be the proportion of the first constitute by volume and $(1-\phi)$ be the proportion of the second constitute by volume. The mean density is then $$\rho = \phi \rho_w + (1-\phi)\rho_a, \quad (1)$$

The average elasticity is similarly given by $$\frac{1}{E} = \frac{\varphi}{E_w} + \frac{(1-\varphi)}{E_n}, \quad (2)$$

and the mean sound velocity is $$C = \sqrt{\frac{E}{\rho}} = \sqrt{\frac{E_w E_a}{\{\varphi E_a + (1-\varphi)E_w\}\{\phi\rho w + (1-\phi)\rho\}}}. \quad (3)$$

As can be seen from Eq. 3, [See, e.g., Preston S. Wislon, "Low-frequency dispersion in bubbly liquids", Acoustics Research Letters Online, [DOI: 10.1121/1.1903024], June 2005], the sound speed is determined by the volume fraction, the density and the elastic properties of gas and liquid and does not involve bubble size. This is the value of the sound speed at zero frequency if the curve in FIG. 1a is extended to zero frequency. However, in practice it is seen that this equation holds for any frequency that is less than the bubble resonance frequency region. Equations 1-3 are also known as Wood's equations. These equations are valid for most two-phase components in the limit that the wavelength of sound is much greater than the size of any droplets (or inclusions) of one medium in a host medium. Because of the high compressibility and low density of the gas, the sound speed can be very low at volume fractions away from the two limiting values (0 and 1). The bubble resonance frequency region is considered the region separating the low-frequency from the high-frequency regions.

Measurement of sound speed in the low-frequency region can thus provide a direct measure of the gas volume fraction provided the density and elasticity (or compressibility) of each of the constituents is known. This can be either obtained from literature values or from calibration measurements using the pure constituents. This calibration needs to be done as a function of temperature over the operating temperature range as both sound speed and density vary with temperature. If the density and the sound speed are measured for each constituent, the elasticity (compressibility) can be easily determined from the two measured parameters. It should be pointed out that if the liquid is also a mixture, such as an oil-water emulsion, then equations 1-3 hereinabove, can be used to determine the effective properties of the mixture, because the droplet sizes of oil in water or water in oil are much smaller than the wavelength used to make the sound speed measurements. Various measurements of sound speed in the low frequency region will be described below for a multiphase system.

The natural frequency of a bubble that is large on both thermal and Laplace scales is derived in "On musical air-bubbles and the sounds of running water," by M. Minnaert, Philos. Mag. 16, pp. 235-248 (1933)]. This natural frequency, denoted by $f_o = \omega_o/2\pi$, where $$\omega_0 = \frac{1}{R_0}\sqrt{\frac{3\gamma P_{Liq}}{\rho_{Liq}}}, \quad (4)$$

is referred to as the "Minnaert frequency". In Eq. 4, $\gamma$ is the gas constant and $R_o$ is the radius of the bubble. A resonating bubble strongly scatters sound and introduces a large attenuation of sound in the frequency region where bubbles oscillate in a bubbly fluid. This hinders traditional sound transmission measurements as almost no sound is transmitted through such a bubbly fluid if an attenuated frequency is selected. As may be observed from Eq. 4, the resonance frequency depends on the bubble size and if there is a distribution of bubble sizes present in the fluid, a range of frequencies will not be transmitted through this fluid with a maximum attenuation occurring at the maximum bubble concentration. Therefore, single-frequency acoustic measurements in certain frequency ranges often encounter problems.

To determine the sound propagation in such a bubbly fluid over a wide frequency range that encompasses the various frequency ranges discussed above, a more involved analysis is needed. See, e.g., "Linear pressure waves in bubbly liquids: Comparison between theory and experiments," by K. W. Commander et al., J. Acoust. Soc. Am. 85, 732-746 (1989), wherein a model for sound propagation in bubbly liquid is presented, which accounts for various factors including thermal dissipation in a detailed way. In this model, the host liquid has sound speed $c_l$, density $\rho_l$, viscosity $\mu$, surface tension $\sigma$, and an equilibrium pressure $P_\infty$. The bubbles are composed of a gas with thermal diffusivity Dg and ratio of specific heats $\gamma$. For a monodisperse bubble population with n bubbles per unit volume, each possessing equilibrium radius a, which yields a mixture void fraction $\varphi = 4/3\pi a^3 n$. The complex mixture sound speed $c_m$ is given by $$\frac{1}{c_m^2} = \frac{1}{c_l^2} + \frac{4\pi a n}{\omega_o^2 - \omega^2 + 2ib\omega}, \quad (5)$$

where $\omega$ is the circular frequency and b the damping term that includes viscous, thermal, and acoustic dissipation. Both sound speed and sound attenuation propagating through a bubbly fluid can be derived from this analysis (See FIGS. 1a and 1b for an example of sound speed and attenuation). As stated hereinabove, sound scattering by the bubbles is related to sound attenuation.

Figure 2:
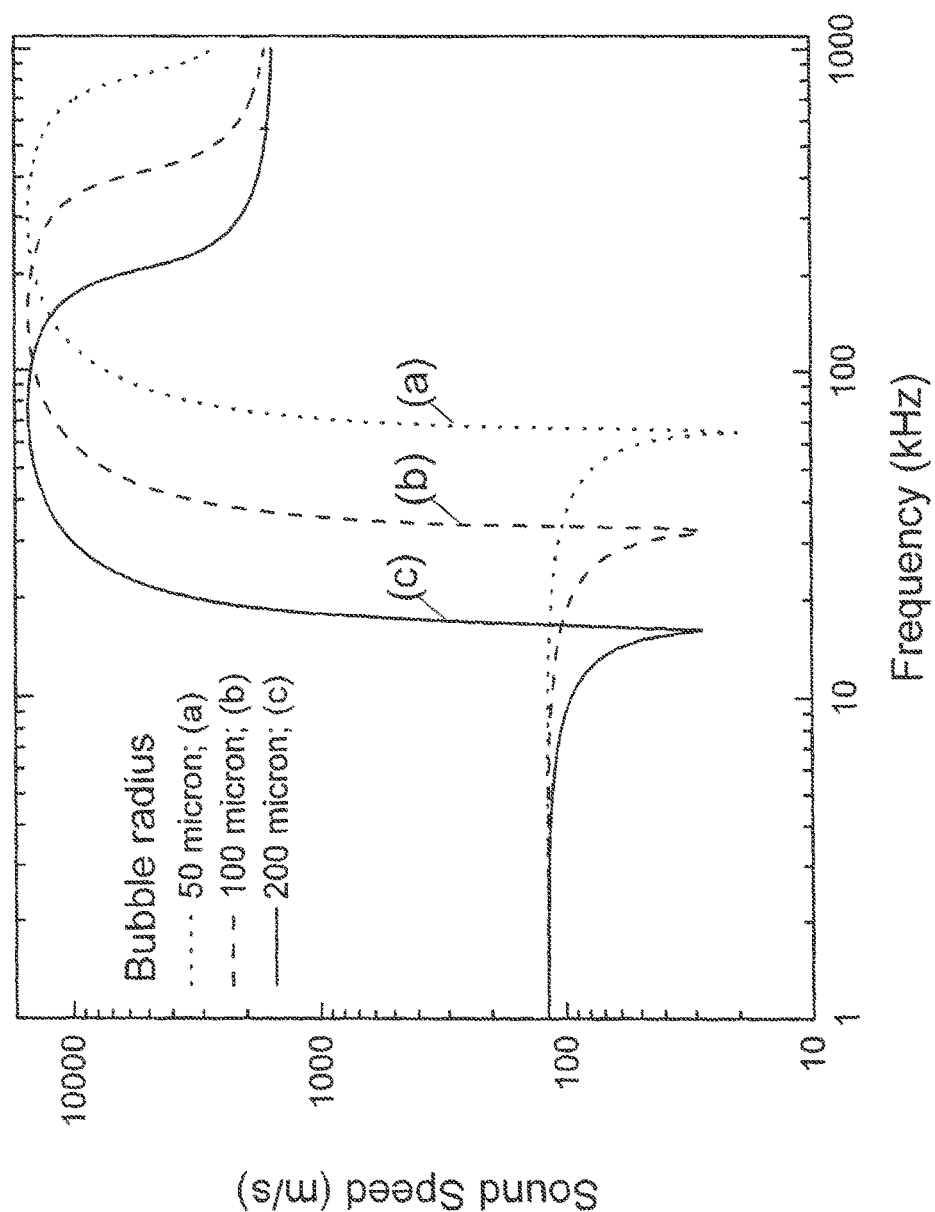
FIG. 2 is a log-log plot of the calculated sound speed in a bubbly fluid as a function of sound frequency for three different bubble sizes (50 μm (curve (a)), 100 μm (curve (b)) and 100 μm (curve (c)) bubbles), respectively.
Figure 3:
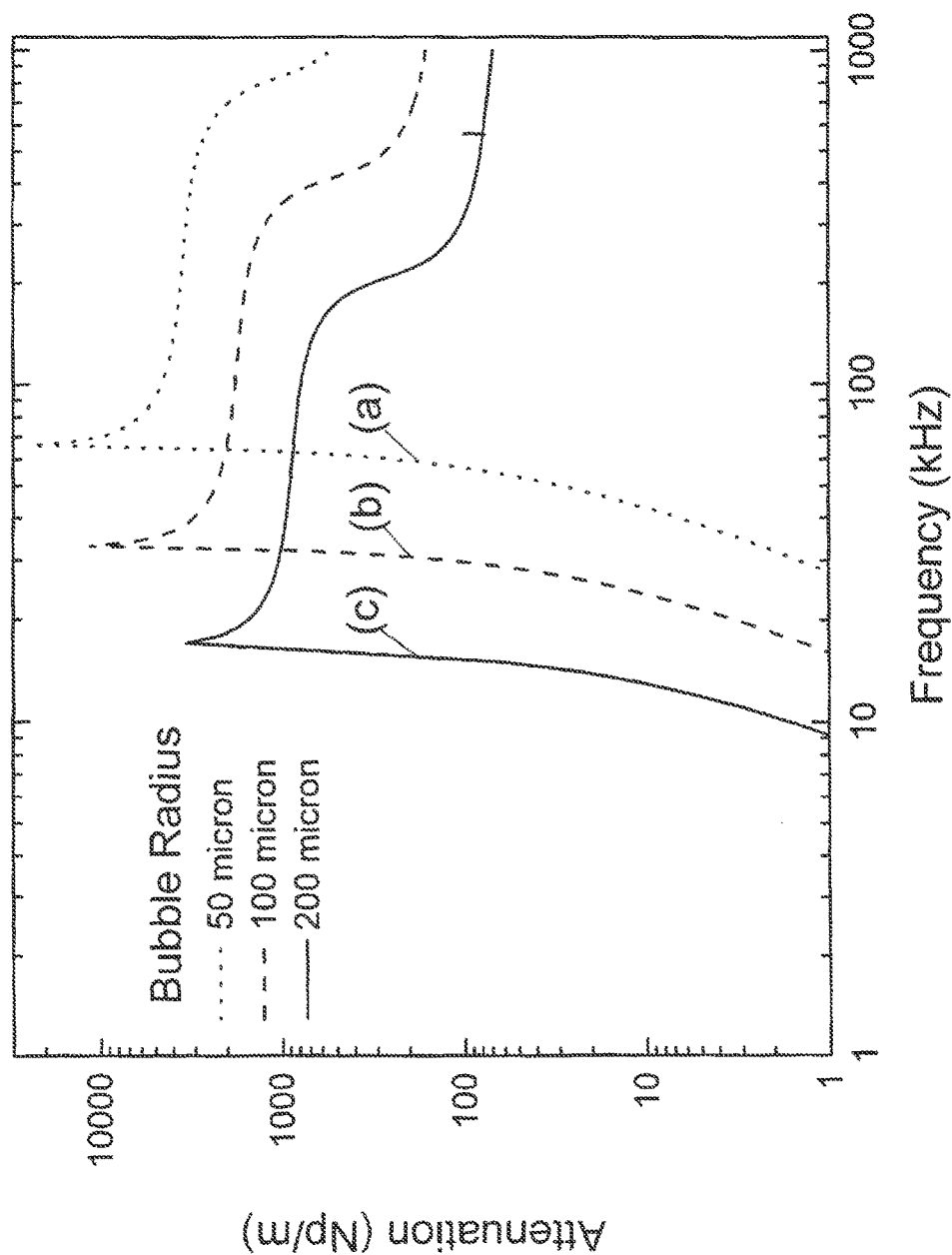
FIG. 3 is a log-log plot of the calculated sound attenuation in a bubbly fluid as a function of sound frequency for three different bubble sizes (50 μm (curve (a)), 100 μm (curve (b)) and 100 μm (curve (c)) bubbles), respectively.

FIGS. 2 and 3 show calculated sound speed and sound attenuation in a bubbly fluid for three different bubble sizes (50 μm (curve (a)), 100 μm (curve (b)) and 100 μm bubbles (curve (c)), respectively. In these FIGURES, both axes are shown in log-scale. This is the typical range of bubbles one encounters in an oil field. It should be mentioned that for smaller bubble sizes the curves shift to higher frequencies. In a typical mixture, a narrow distribution of bubble sizes having a dominant mean value with smaller numbers of bubbles on both sides of the mean (~30% in size) is expected. FIGS. 2 and 3 show the behavior for only monodisperse bubble distribution and fixed volume fraction. The larger the bubble size, the lower is the number of bubbles. Larger numbers of bubbles tend to spread the curves to the higher frequencies making those wider in frequency range. From FIGS. 2 and 3, it may be observed that conventional single-frequency measurements are limiting and broadband measurements are preferred. Broadband measurements may be made by using frequency chirp excitation, as an example, and measuring both sound transmission and sound scattering. Both the transmitted and scattered data would have similar characteristics to that of the sound transmission shown in FIG. 3, and the bubble size distribution can be obtained with a modified theory that takes into account this distribution. Such inversion techniques have been proposed by various researchers. [See, e.g., "An Inversion of Acoustical Attenuation Measurements to Deduce Bubble Populations," by H. Czerski, American Meteorological Society, DOI: 10.1175/JTECH-D-11-00170.1 (2012)].

Figures 4, 5:
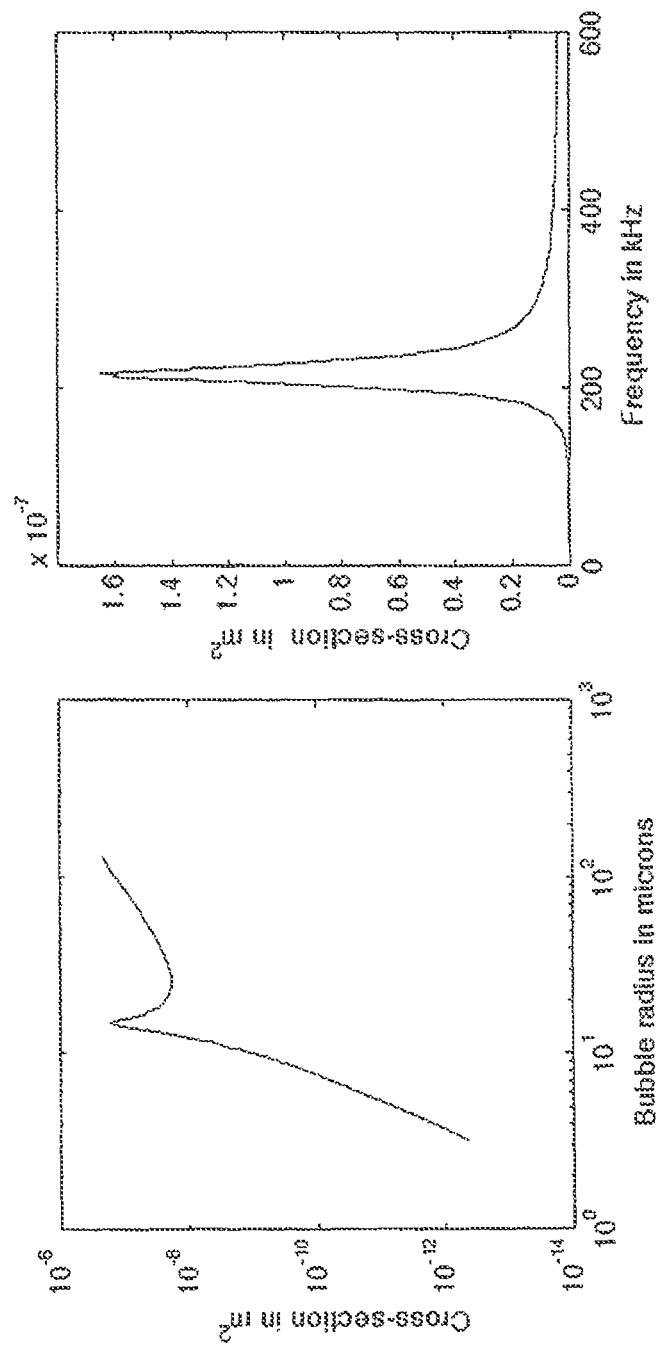
FIG. 4 is a log-log plot of the extinction cross-section as a function of bubble size at a fixed frequency of 217 kHz, which is the resonance frequency of a 15 μm bubble.
FIG. 5 is a log-log plot of the scattering cross-section of a single bubble having a radius of 15 μm as a function of sound frequency.

FIG. 4 shows the extinction cross section of different size bubbles at a fixed frequency of 217 kHz, which is the resonance frequency of a 15 μm bubble, while FIG. 5 shows the scattering cross-section of a single bubble with a radius of 15 µm as a function of frequency. For a bubbly fluid that has multiple sizes of bubbles, the scattered signal peak widens. Again, this shows how the presence of resonant gas bubbles can affect acoustic measurements in a bubbly fluid.

Figure 7:
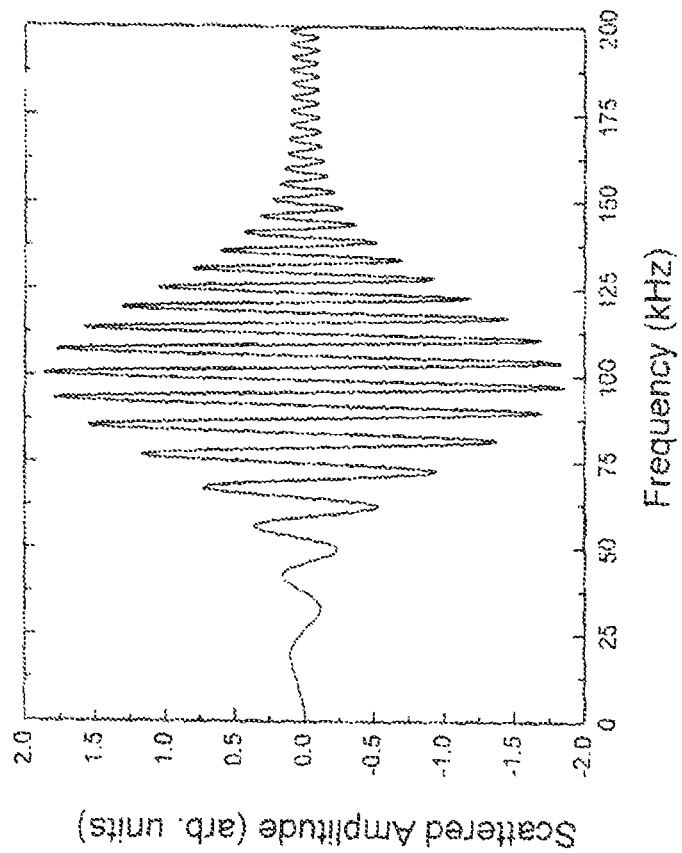
FIG. 7 is a graph of the amplitude of the scattered signal from a bubbly fluid having bubbles with different sizes centered about a mean value, as detected by a broadband receiver transducer in response to a chirp signal of the type illustrated in FIG. 6 hereof.
Figure 6:
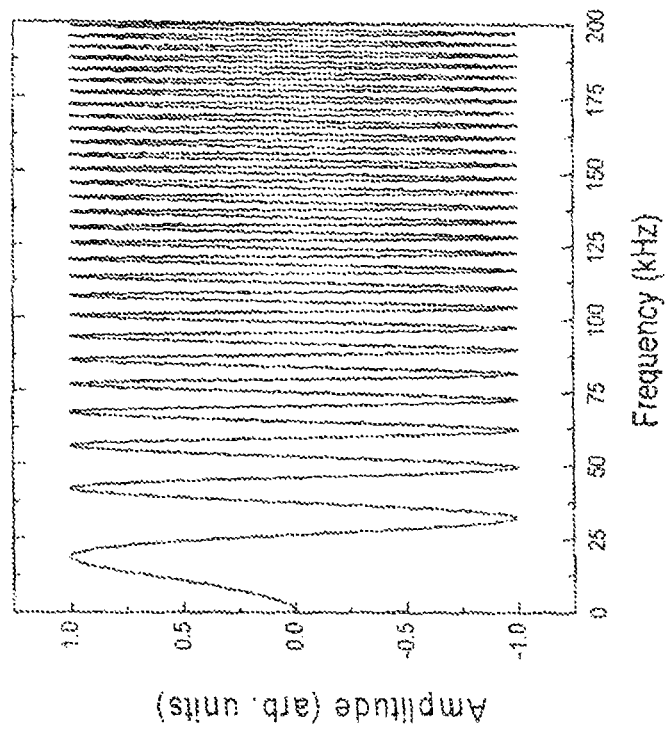
FIG. 6 is a graph the amplitude of a chirp signal as a function of frequency varying between 1 and 200 kHz used to excite a piezoelectric transducer that in turn excites a bubbly fluid.

FIG. 6 shows a chirp signal (with the frequency varying between 1 and 200 kHz) used to excite a piezoelectric transducer that in turn excites a bubbly fluid. The behavior of the scattered signal detected by a broadband receiver transducer is shown in FIG. 7. In this case the bubbly fluid has different sizes of bubbles centered about a mean value. The envelope of this scattered signal can be used in the calculation to determine bubble size distribution and the population of the bubble in the volume of fluid that is excited by the chirp signal. This shows the advantage of using a broadband measurement approach and making measurements at an angle, as will be described hereinbelow.

Figure 8:
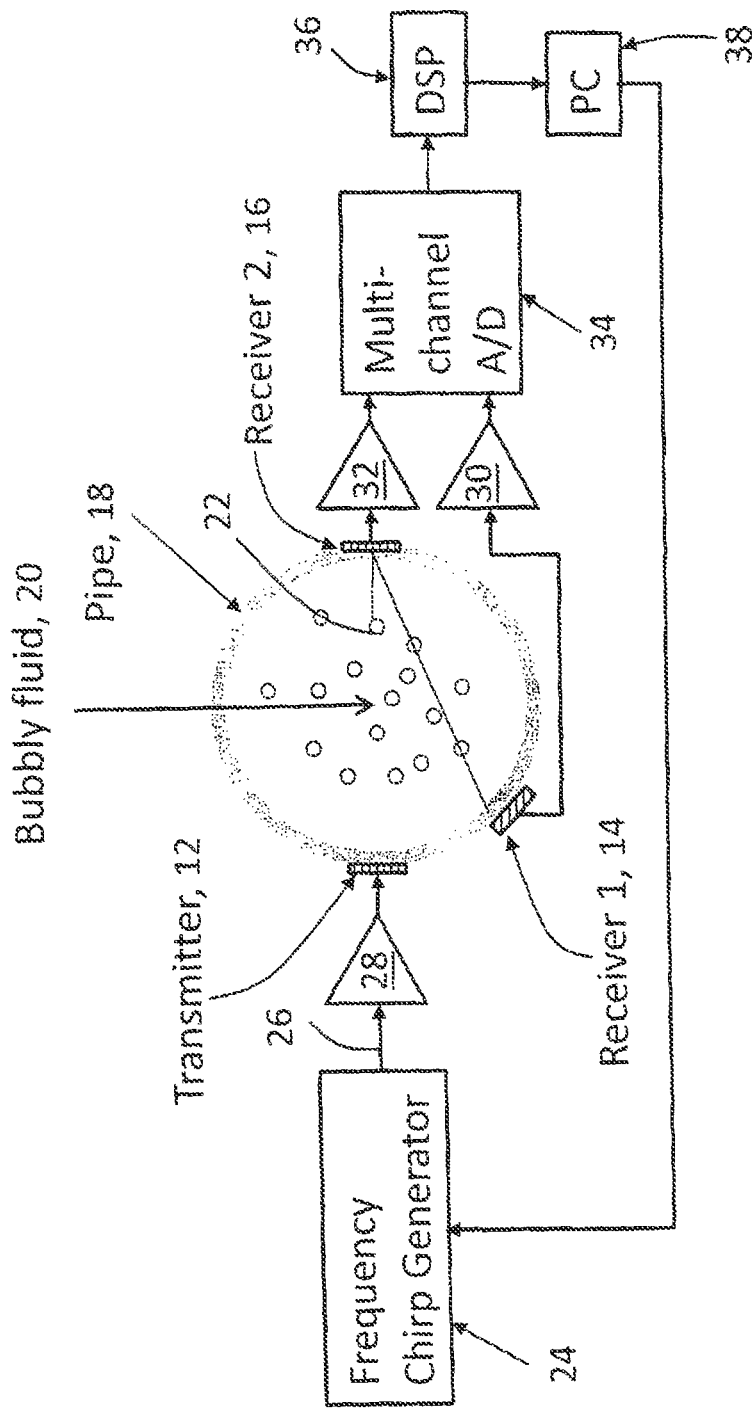
FIG. 8 is a schematic representation of an embodiment of the apparatus of the present invention illustrating a broadband piezoelectric transducer used as a transmitter, and two identical transducers used as receivers, one receiver detecting the transmitted signal, and the other, disposed at an angle to the transmitting transducer, detecting the scattered signal.

Reference will now be made in detail to the present embodiments of the invention, examples of which are illustrated in the accompanying drawings. In the FIGURES, similar structure will be identified using identical reference characters. It will be understood that the FIGURES are for the purpose of describing particular embodiments of the invention and are not intended to limit the invention thereto. Turning now to FIG. 8, a schematic representation of an embodiment of apparatus, 10, of the present invention is shown, illustrating broadband piezoelectric transducer, 12, used as a transmitter and two other identical transducers, 14, and 16, used as receivers. Receiver 16 is positioned directly opposite transmitter 12 to measure the directly transmitted sound, while receiver 14 is placed at angle to the applied ultrasound. The transducers may be curved piezoelectric crystals (PZT-5) that match the curvature of pipe, 18, carrying fluid mixture, 20. It is also possible to use flat faced transducers and use a wedge to couple the flat transducer surface to the curvature of pipe 18. If noninvasive measurement is not required, the transducers may be inserted through the pipe wall through a hole such that the front face of each transducer is flush with the inner surface of the pipe (not shown in FIG. 8). Angle, 22, may be varied between 0° and 90° to locate the position of the best measurement. An angle of 0° allows the backscattered signal to be measured. In practice, the receiver is placed almost next to the transmitter in that case. Multiple receivers placed at several angles may also be used. The temperature of the pipe is also measured using a thermometer, as an example (not shown in FIG. 8).

A. Measurements in the Bubble Resonance Frequency Range:

Digital, dual-channel arbitrary waveform generator, 24, (See FIG. 15) generates frequency chirp signal, 26, over a broad frequency range, which is directed to transmitter (source) transducer 12 through power amplifier, 28. This frequency chirp signal has a duration that can be adjusted from about 100 µs to about 10 µs depending on the pipe diameter. The chirp signal may be repeated at a rate as high as 1000 times per second. The output from a second channel in waveform generator 24 having a different frequency can be directed to the same transducer for frequency mixing, as will be described hereinbelow. The frequency range is selected based on the nature of the bubbly fluid and the bubble size distribution. Waveform generator 24 may produce frequency chirps in chosen bands between 1 kHz to 50 MHz. A frequency range between 1 kHz and 1 MHz may be used for bubble resonance measurements, whereas higher frequencies may be used for measurements in the high-frequency region. If a high center frequency (e.g., 10 MHz) broadband transducer is chosen, a single transducer can provide the required bandwidth for both these measurements. Although the sensitivity of transducers slowly diminishes on both sides of the center frequency, the received signals can be corrected for this reduction if the transducer characteristics are first determined. To extend the bandwidth, other generation approaches may be employed, such as a transducer that is made of two separate crystals mechanically sandwiched together. By connecting two identical crystal electrodes in series or in parallel, the center frequency can be changed by a factor 2. In this situation, the crystal thickness is doubled.

The output from the receiver transducers, 14 and 16 are first amplified by signal amplifiers, 30 and 32, respectively, before being digitized by a high speed (50 MHz sampling rate, 12-bit A/D) multichannel Analog-to-digital converter, 34. Although only two channels are shown, as many as 8 input signals can be accommodated. The output from digitizer 34 is directed to Digital Signal Processor (DSP), 36, before being input to personal computer (PC), 38, for further analysis. DSP 36 permits fast signal processing, such for Fast Fourier Transforms (FFT), cross-correlation, Hilbert transforms for envelope detection, etc. The same apparatus may be used in other embodiments of the present invention with minor variations. PC 38 controls waveform generator 24 and other elements of apparatus 10, and displays the final result on a computer screen.

The scattered signal measurement can also be analyzed by DSP 36 to extract Doppler signals from the movement of the bubbles within the sound scattering field. Typically, every transducer has a certain beam spread and this beam spread allows Doppler measurement even in the situation where the bubble movement is perpendicular to the direction of the central part of the sound beam from source transducer 12. It may be convenient to place receiver transducer 14 at a position that is vertically displaced from source transducer 12 so that the beam profile of both transducers overlaps. This provides additional angle for more accurate Doppler measurement. The exact amount of vertical displacement depends on the pipe diameter and the transducer diameter. The Doppler measurement may provide additional information about the flowing bubbly fluid since the magnitude of the Doppler signal is related to the magnitude of the scattered signal which is, in turn, is related to the size of the bubbles. A measure of the bubbles size distribution may therefore be provided, while the Doppler frequency shift provides a measure of the bubble movement (flow rate) with the flow. This bubble flow rate is important for correcting the volumetric flow rate of the oil-water mixture. A magnitude of radial variation in the bubble flow rate inside the pipe can also be determined from this frequency shift from the width of the Doppler shift signal. A distribution of the frequency shifts can also be determined and related to the flow of the bubbles. In addition, different bubble sizes produce slightly different viscous drag and correspondingly their speed varies. These effects somewhat smear the Doppler frequency shift, but the shift nevertheless contains information about size distribution that can be extracted from an appropriate inversion technique. The gas volume may be determined from the size distribution (number of bubbles) flowing through a chosen volume of pipe from the Doppler flow measurement if the flow rate is known. The same transducer positioned at angle 22 can be used for both scattered signal and Doppler measurement by treating the signal differently in the DSP. Once the signal is digitized, all the necessary computations for extracting the Doppler frequency shift information may be carried out digitally either in DSP 36 or in PC 38. The Doppler frequency shift is determined using the traditional manner of frequency mixing (transmitted with received signals) and extracting the frequency difference. A digital bandpass filter can also be applied to the chirp received signal to extract values from any narrow frequency range.

Figure 9:
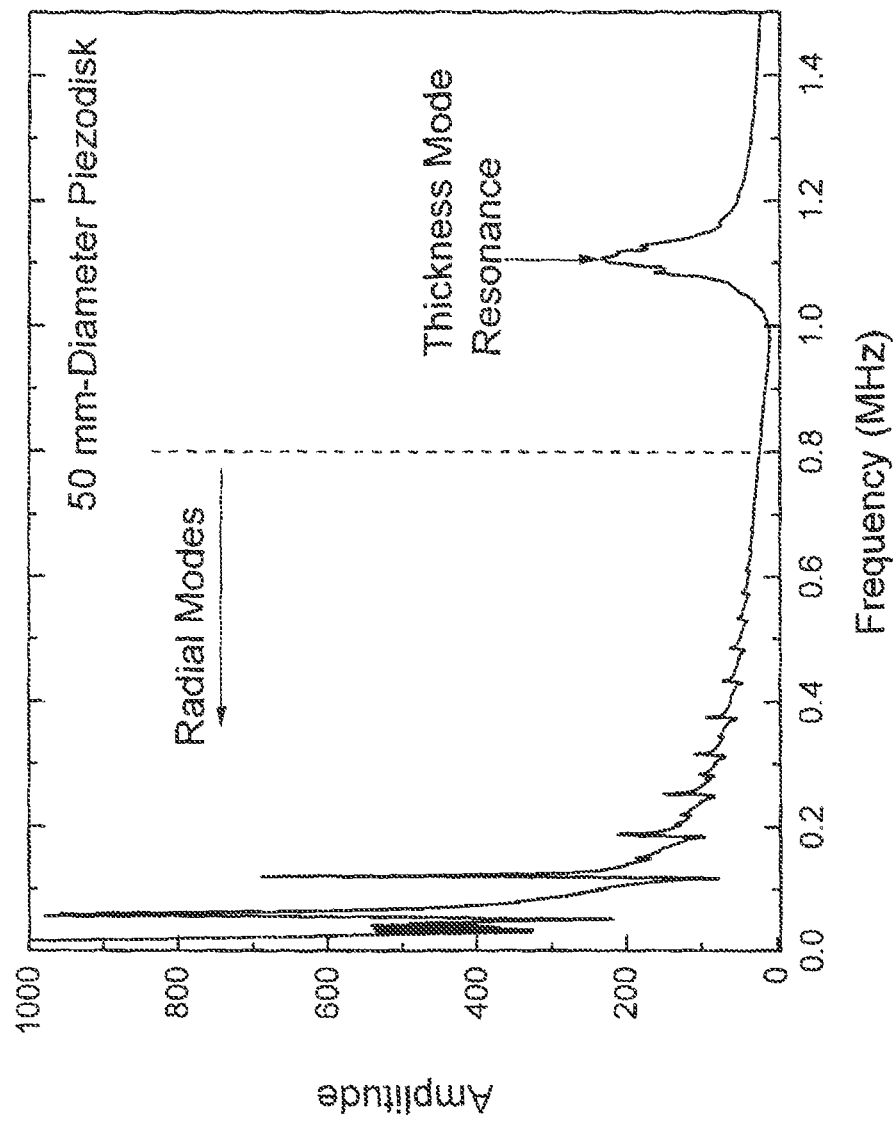
FIG. 9 is a graph of the amplitudes for the various resonances of a 50-mm diameter piezoelectric crystal, as a function of frequency, the thickness mode resonance of this crystal being at about 1.1 MHz, whereas the radial modes extend to low frequencies, the lowest radial mode of this crystal being about 50 kHz, for this geometry.
Figure 10:
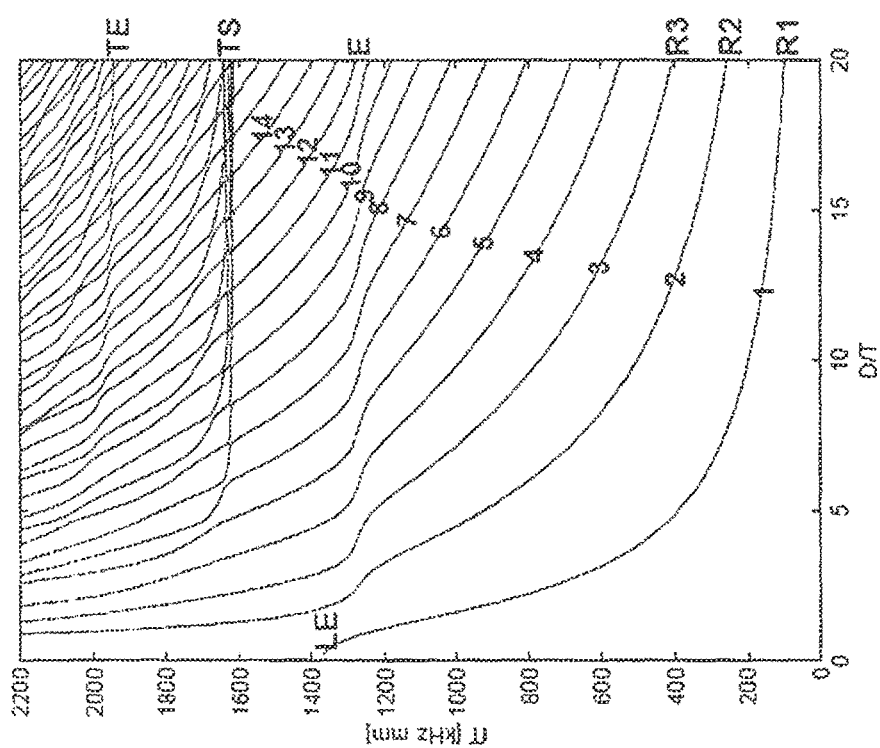
FIG. 10 shows designs for crystals for generating radial mode resonances, wherein frequency multiplied by the disk thickness is plotted against the ratio of disk diameter to disk thickness, the numbered curves representing different radial modes with higher modes having higher frequencies.

B. Low-Frequency Measurements:

Low-frequency sound speed measurement in the region where Wood's equations is applicable will now be described. Traditional piezoelectric transducers operate in the thickness resonance mode where the resonance frequency is inversely proportional to the thickness, making a low-frequency transducer operating at about 25 kHz or less rather unwieldy and impractical. Therefore, other approaches were explored for generating such low frequencies using piezoelectric materials. Piezoelectric materials are used because these materials are capable of withstanding the high temperatures experienced in oil fields; as an example, a transducer made from lithium niobate crystal can operate up to a temperature of about 500° C., as an example. Low frequencies may be generated from a piezoelectric disk by exciting the radial modes of the disk instead of operating the transducer in the traditional thickness mode resonance. This is not how conventional piezoelectric transducers operate or are used in practice. Based on the thickness-to-radius ratio, the frequencies of the radial modes of a piezoelectric disk may be determined. Low-frequency radial modes less than about 25 kHz may readily be accessed. FIG. 9 shows the various resonances of a 50-mm diameter piezoelectric crystal as a function of frequency. The thickness mode resonance of this crystal is at about 1.1 MHz, but the radial modes extend to low frequencies, the lowest radial mode being about 50 kHz for the particular piezoelectric disk chosen. Designs for crystals for producing radial mode resonances are shown in FIG. 10, wherein frequency multiplied by disk thickness, T, is plotted on the y-axis while the ratio of disk diameter, D, to disk thickness is plotted on the x-axis. The numbered curves designate different radial modes, with the higher modes having higher frequencies. One selects a DIT ratio and draws a vertical line in the plot. The intersection points on the various curves provides the radial modes of that particular disk (See, e.g., Kocbach, J. 2000, Finite Element Modeling of Ultrasonic Piezoelectric Transducers—*Influence of geometry and material parameters on vibration, response functions and radiated field*, Ph.D. thesis, University of Bergen, Department of Physics)

Figure 11:
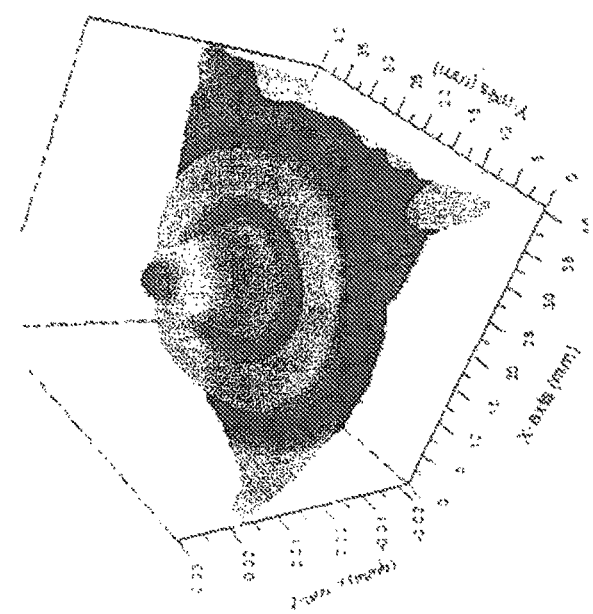
FIG. 11 shows the surface vibration amplitude profile of a piezoelectric disk vibrating in a radial mode (52 kHz), the ring patterns (amplitude and spacing) having the form of Bessel functions in the manner in which the intensity of the vibration changes from the center of the disk to the outer edges, with higher modes having a greater number of rings.

FIG. 11 shows the surface vibration amplitude profile of a piezoelectric disk vibrating in such a radial mode (52 kHz) measured using a scanning laser Doppler vibrometer. The ring patterns (both amplitude and the radial distribution) are in the form of Bessel functions in the manner in which the intensity of the vibration changes from the center of the disk to the outer edges. Higher Bessel modes have more rings. Such a transducer generates a Bessel beam that has limited diffraction (does not spread as it propagates) and self-healing. Self-healing refers to the fact that if the central portion of the beam is blocked (e.g., by bubbles in this situation), the beam recreates itself after a short distance.

Figure 12:
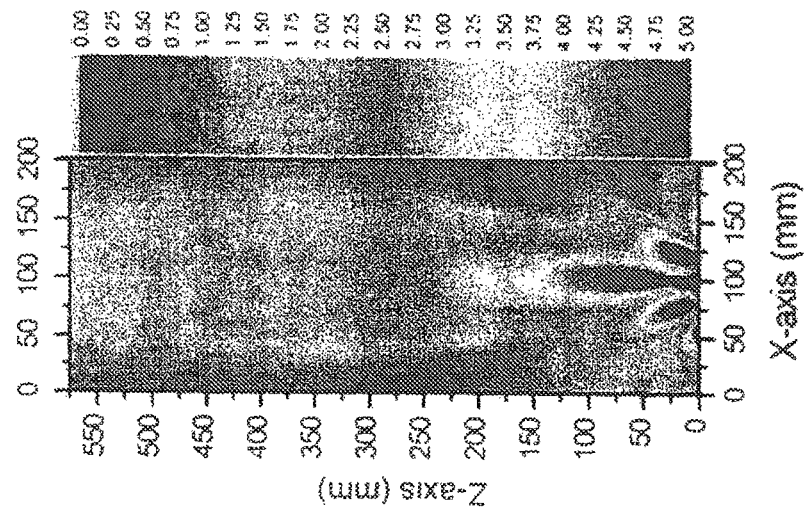
FIG. 12 shows the beam profile of a radial mode transducer described in FIG. 11, hereof, measured inside a water tank by scanning with a hydrophone.

FIG. 12 shows the beam profile of such a radial mode transducer measured inside a water tank by scanning with a hydrophone. This is a Bessel beam generated using the transducer described in FIG. 11, hereof. As stated hereinabove, piezoelectric materials are utilized for transducers such that devices may operate at the high temperatures encountered in oil fields, and where simpler alternatives are difficult to use. For example, magnterostrictive, electromagnetic, or PVDF films can also be used as acoustic transducers, but these materials are difficult to use at temperatures above 160° F.

Figure 13:
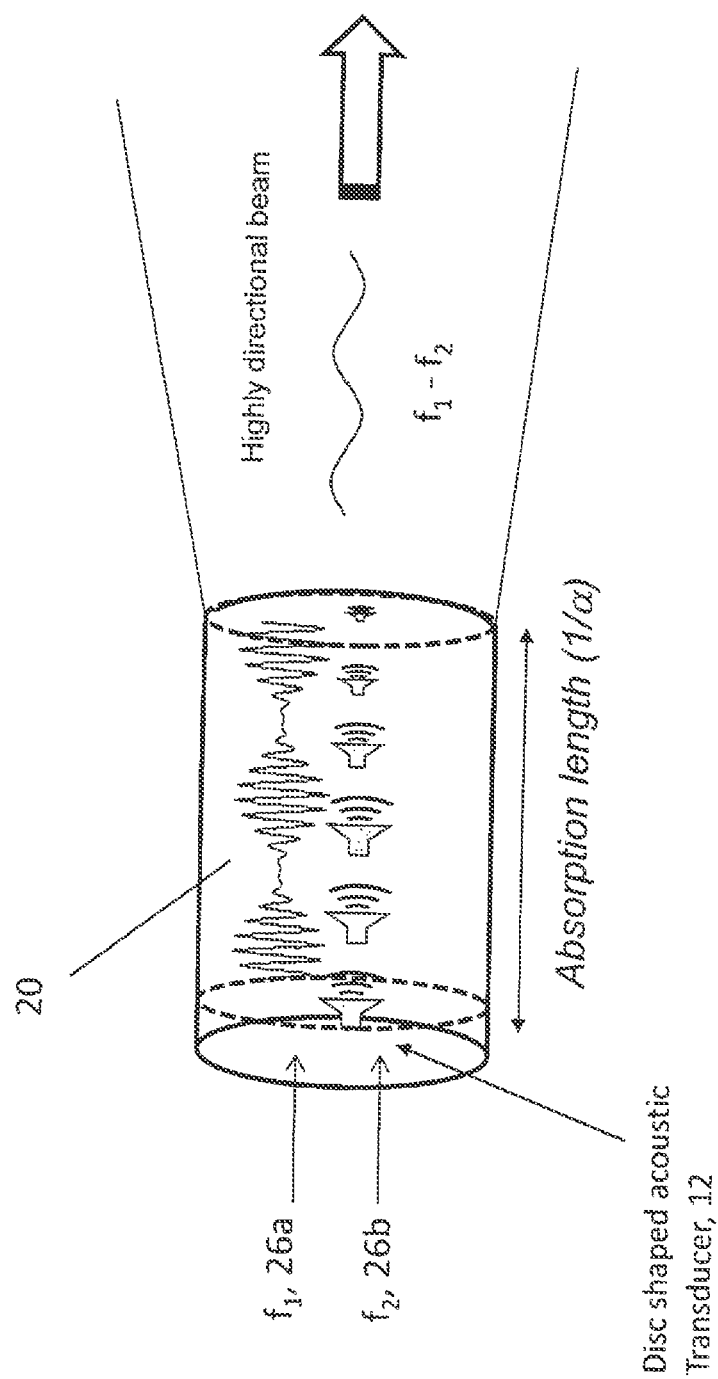
FIG. 13 illustrates the mixing of two frequencies, $f_1$ and $f_2$, in a nonlinear medium, such as the bubbles in a multiphase fluid to generate harmonics as well as frequency mixing, where two higher frequencies are mixed in the medium to produce sum and difference frequencies.

Another method for creating low frequencies utilizes the nonlinear acoustical characteristics of the bubbles themselves. Bubbles have the highest acoustic nonlinearity of any materials. A nonlinear medium allows harmonic generation as well as frequency mixing where two high frequencies can be mixed in the medium to produce sum and difference frequencies. The mechanism of this process is illustrated in FIG. 13. Two, high frequencies, $f_1$ and $f_2$, called the primary frequencies, generated by dual channel arbitrary wave generator 24 are applied to the same source transducer 12 (FIGS. 8 and 16). The high-frequency beams radiate from the transducer in a collinear manner, which improves the efficiency of the mixing process. As the beams propagate through the bubbly fluid, they mix and each point of the fluid acts as a new virtual source of difference frequency. As the beam continues to propagate the intensity decreases because of scattering and the intensity of the virtual sources also decreases. The virtual sources are depicted in FIG. 13 using the symbol for a speaker. The sources radiate and interfere to produce an end-fire array similar to an end-fire TV antenna. This virtual antenna radiates the difference-frequency beam. The directionality of this beam depends on the length of the virtual array. The longer the length, the more collimated the resulting difference-frequency beam becomes, but beyond a certain length (the Rayleigh length) there is no additional gain. If the fluid is highly absorptive then the absorption length will determine the mixing length. The theory of difference-frequency beam formation may be found in "Parametric Acoustic Array," by Peter J. Westervelt, J. Acoust. Soc. America, 35, 535 (1963). In the present situation of a bubbly fluid, which is a dynamic condition, the mixing length is small and the difference-frequency beam spreads in all directions with a preference for the flow direction. If one of the primary frequencies falls in the bubble frequency region, the frequency mixing efficiency significantly increases. Even away from the bubble resonance frequencies, the bubbly medium is strongly nonlinear acoustically.

Figure 14:
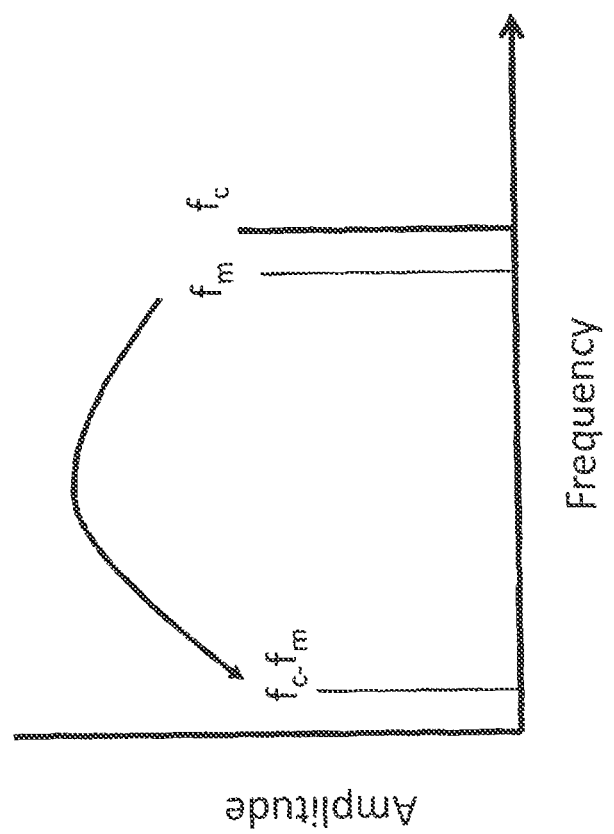
FIG. 14 is a schematic representation of a modulation method for frequency mixing in the nonlinear bubble medium, where $f_c$ is the high frequency carrier and the $f_m$ the modulating signal, and the result of mixing is the difference frequency, $f_c$-$f_m$.

It should be mentioned that it is not always necessary to mix two separate frequencies but simply to excite the source transducer with an amplitude-modulated signal. Waveform generator 24 can provide such a signal and, in that situation, only a single output is used to excite source transducer 12. The acoustically nonlinear bubbly fluid demodulates the AM signal to produce the low-frequency envelope, which is a type of frequency mixing since an amplitude-modulated signal is a carrier frequency with two side bands which represent the low frequency. These side bands and the carrier mix to produce the difference frequency. Various methods for amplitude modulation may be employed, such as single side band (SSB) modulation, or carrier-suppressed, double-sideband, etc., which will perform equally well for the present requirements. The modulation method is schematically shown in FIG. 14, where $f_c$ is the high frequency carrier and the $f_m$ the modulating signal, and the result of mixing is the difference frequency. As stated hereinabove, the carrier frequency can be chosen within the bubble resonance frequency for higher efficiency.

Figure 15:
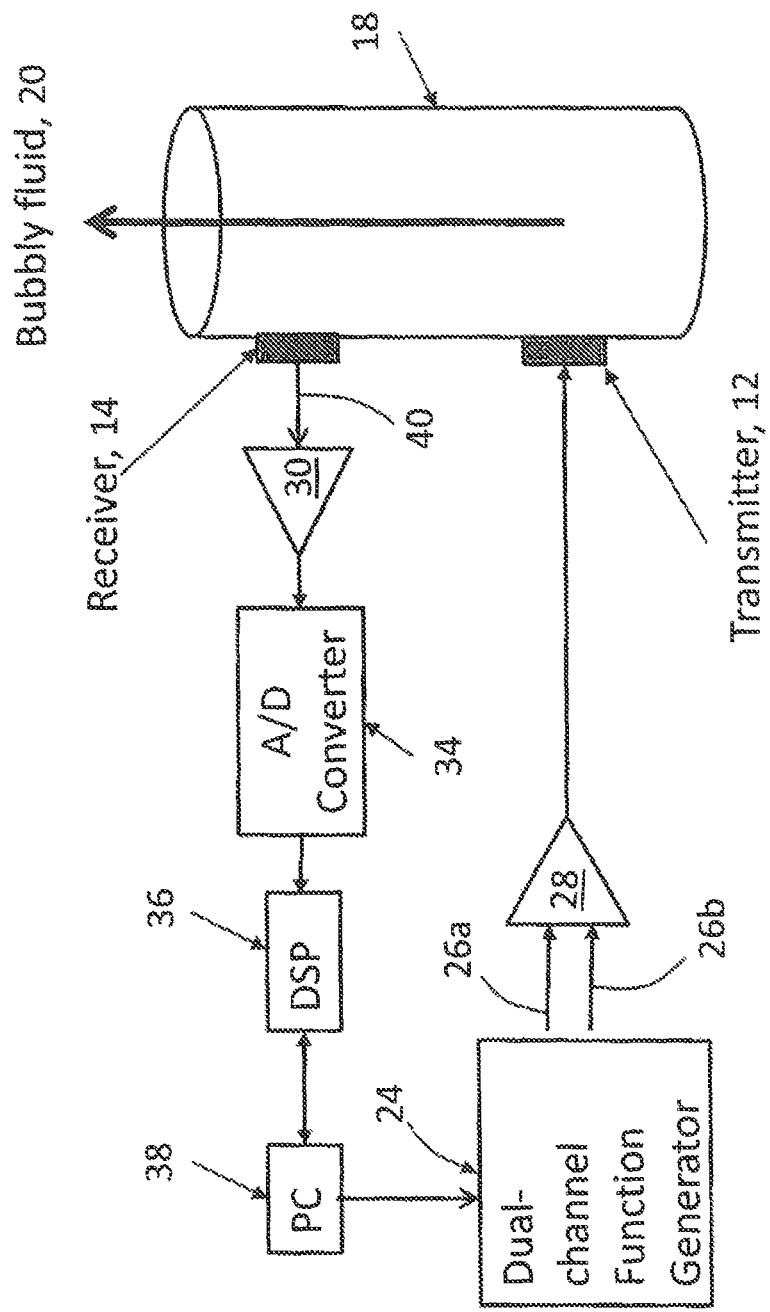
FIG. 15 is a schematic representation of an embodiment of the apparatus of the present invention for mixing two frequencies produced by the same function generator in the nonlinear bubble medium in a vertically oriented pipe in which the bubbly fluid is flowing to generate the difference frequency therefrom.

As described hereinabove, the frequency mixing embodiment hereof utilizes two frequency signals, 26a, and, 26b, generated by function generator 24 operating in a burst mode, and simultaneously applied to source transducer 12 following amplification using power amplifier 28 as shown in FIG. 15. The transducers can also be in the configuration shown in FIG. 16b, below. Since high frequency (greater than or equal to about 300 kHz) primary frequencies are used, there is efficient sound transmission through the pipe wall for introducing the signal. It is advantageous to match the primary frequencies (at least one of the primary frequencies) to the thickness wall resonance frequency to maximize the sound transmission through the wall. Also as described hereinabove, an amplitude modulated scheme can also be used. The signal received by transducer 14 is converted to an electrical signal, 40, in transducer 14, which is then amplified by signal amplifier 30 and digitized by A/D converter 34 before being directed to DSP circuit 36. The DSP low-pass filters the signal to remove any high-frequency content, and performs a cross-correlation of the transmitted signal and the received signal for providing an accurate measurement of the time taken by the low difference frequency generated in the bubble cloud near the source transducer to travel to the receiver transducer. Since the bubbles are in a dynamic condition, there is significant amplitude fluctuation in the received signal. Cross-correlation of the applied signal to the transmitter (difference frequency derived from the two primary applied frequencies) and the amplified received signal provides high signal-to-noise ratio in the presence of significant noise, and picks out the time delay (propagation time) even when the signal is completely buried in noise. Since the vertical distance between the transmitter and the receiver is known, the sound speed is determined from the time delay and the distance. It should be pointed out that frequency mixing in a nonlinear medium can generate a wide frequency range in the low-frequency range. For example, generating frequencies ranging from about 100 Hz to approximately 35 kHz is possible with the same high-frequency transmitter transducer. The receiver transducer can be any low frequency detection device with sensitivity at the desired low-frequency including microphones. Both frequency chirp and fixed frequency (difference frequency) can be used for this measurement and the frequency can be easily adjusted by adjusting the frequency applied to the transmitter through the dual channel function generator.

Figure 16A:
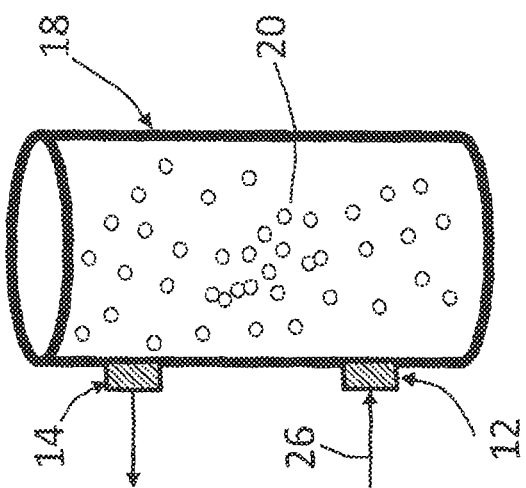
Figure 16B:
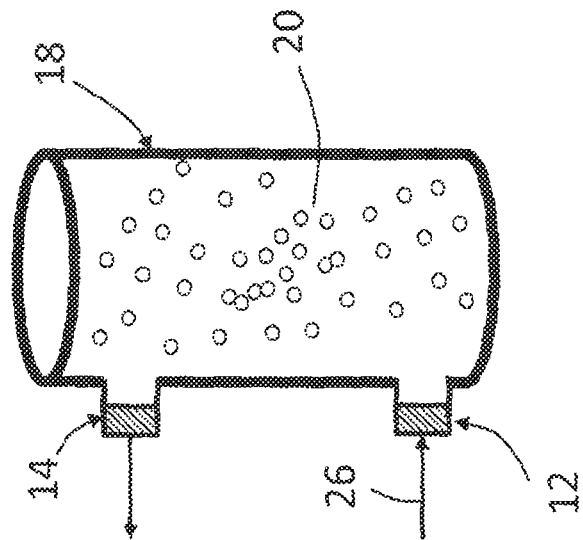
FIG. 16b is a schematic representation of transducers in direct communication with the fluid in a pipe.

Measurements are advantageously made in the vertical direction along the axis of a pipe carrying the bubbly fluid, such that the excitation is done at one horizontal location and the receiver is positioned at a vertical location displaced above the excitation source. In this manner, the sound propagates through the bubbly fluid and interrogates a larger volume (the entire inner volume of the pipe section) for better accuracy. FIG. 16 shows two transducer deployments on a pipe: FIG. 16a is noninvasive and FIG. 16b is a schematic representation of transducers in direct contact with the fluid inside the pipe. The source and the receiver transducers are shown vertically separated. The implementation shown in FIG. 16b is advantageous since it permits introduction of the low-frequency signal directly into the liquid without exciting the pipe.

Figure 17:
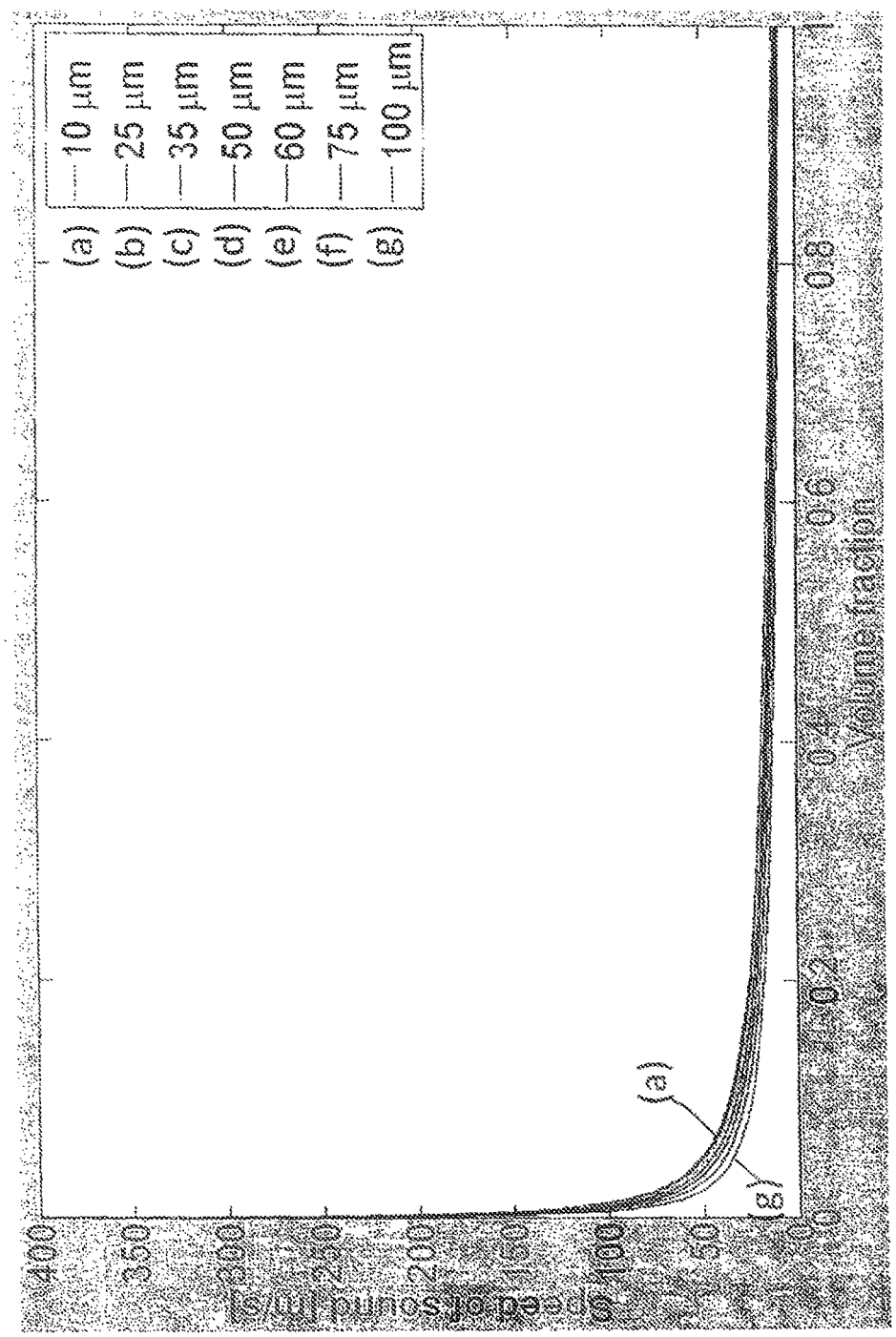
FIG. 17 is a graph illustrating theoretical predictions of the sound speed in a bubbly fluid below bubble resonance frequencies as a function of volume fraction for several bubble sizes.
Figure 18:
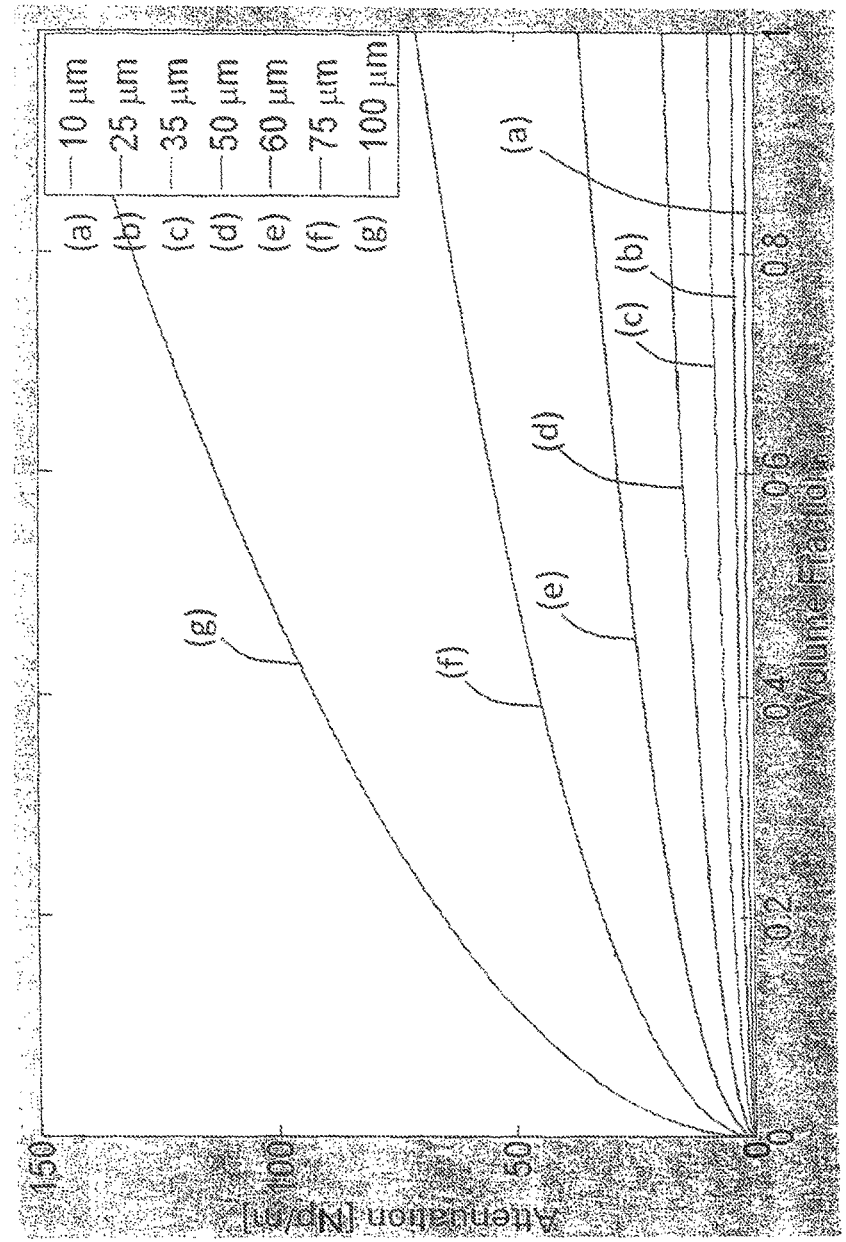
FIG. 18 is a graph illustrating theoretical predictions of the sound attenuation in a bubbly fluid as a function of volume fraction for several bubble sizes.

FIG. 17 shows the predictions of theoretical modeling of sound speed in a bubbly fluid as a function of volume fraction for various bubbles sizes below the bubble resonance frequency. As may be observed from FIG. 17, the actual frequencies have little effect and all the data overlap. This behavior is expected between about 100 Hz and about 25 kHz for bubble sizes varying between 10 to 100 μm in radius. The small variation in the curves with bubble size is actually very small and instrumental accuracy of the present apparatus is about 5%, while the industrial requirement is about 10% accuracy. Although the sound speed is practically independent of bubble size at low frequencies as is predicted by the simple Wood's model, more sophisticated theoretical models do show small variations. Sound attenuation, by contrast, is affected by bubble size as illustrated in FIG. 18. Therefore, sound attenuation is measured as well with the system shown in FIG. 16. If the source excitation level is kept fixed, then the received signal amplitude provides a measure of the sound attenuation due to propagation through the fluid in the pipe. Again, this measurement is somewhat noisy and signal averaging and signal smoothing is needed to obtain high quality measurements. Such signal processing is done in the DSP. Since signal attenuation is easily measured, a combination of the sound speed and attenuation can provide an accurate determination of gas volume fraction. It should be mentioned that measurement of gas volume fraction should be independent of the flow regime (e.g., bubbly, slug, etc.) and should provide the gas volume fraction with greater than 5% accuracy.

Another method for generating low-frequency excitation is to excite the pipe at one of its structural resonance frequencies as shown by Sinha in U.S. Pat. No. 8,166,801 for the measurement of liquid density. The present spools (pipe sections used) are heavy and have thick walls, such that the resonances of the structure show an average effect and a shift, but do not split up. The presence of bubbles changes the effective density of the bubbly fluid in the pipe, and therefore this method provides a direct measure of the weight of the fluid and, correspondingly, the gas volume fraction (GVF). Calibration is straightforward and requires two measurements: one set of structural resonance spectrum (less than or equal to about 30 kHz) when the pipe is empty as compared to when it is completely filled with liquid. Anything in between (any amount of gas presence) can be estimated through a linear interpolation from those two end points. This approach can be used for slug flow and other flow situations when there are no well-defined bubbles, but rather a large quantity of gas. The response time of the measurement depends on the particular structural resonance frequency selected. For example, a 5 kHz resonance frequency will provide a response time of about 200 μs, which is very rapid. The sensitivity of the measurement also depends on the resonance frequencies selected. Lower frequencies provide lower sensitivities than higher ones.

C. High-Frequency Measurements:

For a three-phase measurement, the composition of the oil-water mixture is important. For gas volume fractions (less than or equal to about 60%), high frequencies that are above the bubble resonance frequency region transmit well through a bubbly fluid for a large range of flow rates and flows as high as 8000 barrels of fluid per day have been measured. The measurements may be made in a horizontal direction across the pipe as shown in FIG. 8, hereof. Since the flowing fluid contains bubbles flowing rapidly through the pipe, if measurements are made sufficiently rapidly, (less than or equal to about 100 μs), and the path length is not very large (e.g., 3 in. diameter pipe), the liquid will have moved less than 2 mm during the duration of the measurement, and the likelihood of all of the bubbles lining up in a straight line, thereby obscuring the sound transmission is small. Moreover, because of finite transducer size, the dimensions of the sound beam are much larger than the size of a typical bubble (e.g., 2 cm diameter as compared to <0.1 mm for the bubbles). Bubbles in that region of the diameter of the pipe are of concern, since the sound beam is typically narrow and goes along the diameter of the pipe. Therefore, if the sound transmission measurement is quickly made, and repeated rapidly to obtain an average value, then for gas volume fractions less than or equal to about 60% (experimentally determined with crude oil-water mixture and gas), the sound speed of the host fluid mixture may be determined. In those occasions, when the sound transmission falls below the average value set as a threshold, those measurements can be neglected. In practice, this works well and reliably. When the gas volume fraction increases about approximately 60%, the above method fails. However, for many wells this method provides good measurements for liquid (two-phase) composition. Frequency chirp excitation having a repetition rate as high as 1000 samples per second and measurement between about 500 kHz and about 5 MHz, which are well above the bubble frequency range, combined with cross-correlation and frequency de-chirping analysis techniques provide an accurate determination of sound speed. Once the sound speed for the mixture is determined, the actual oil-water composition can be determined very accurately from a system calibration which involves the sound speed and density measurements of the individual constituents (oil and water) over a relevant temperature range. This calibration is done separately in commercial instruments. Typically, a sample of liquid from an oil well is obtained which is then centrifuged to separate oil from the process water. These separated constituents are then calibrated for sound speed and density. From a modified form of the Eq. 3, the composition may be estimated to an accuracy of better than about 1%.

Figure 19A:
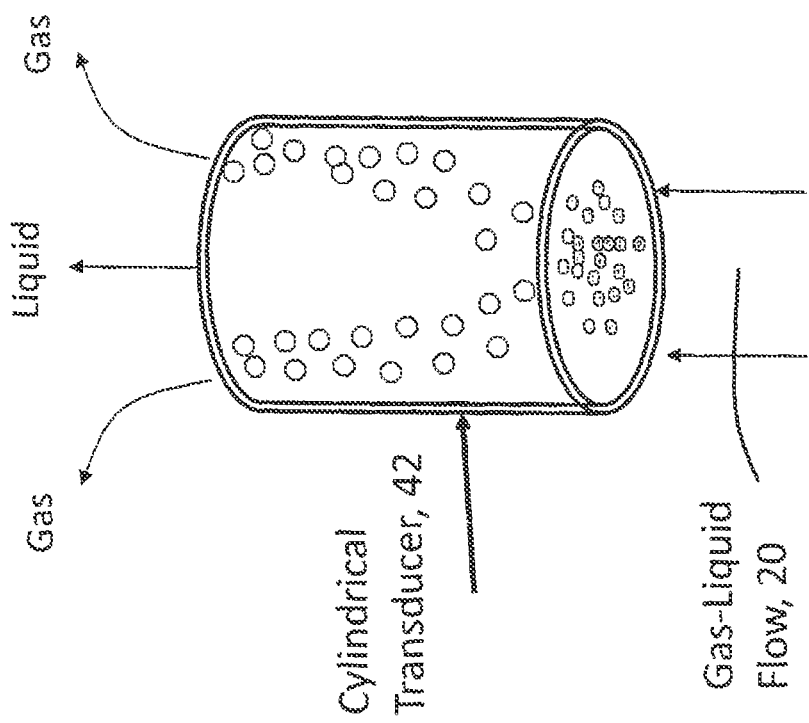

A procedure that may be used for higher gas volume fractions is to manipulate the bubbles and move them away from the measurement region using acoustic radiation pressure from the central region of the pipe, such that the sound beam has no bubbles in its path. FIG. 19a illustrates this method. Annular standing waves are set up in a pipe cavity (here shown as a hollow piezoelectric resonator) and the acoustic force generated in that wave force the bubbles to move to the pressure antinodes. Low frequencies (less than or equal to about 25 kHz), which are lower than the bubble resonance frequency, are effective for this process. The bubbles will move from the central region of the pipe to closer to the wall if an appropriate frequency that depends on the geometry of the cylinder (pipe) and the sound speed in the fluid, is chosen. Since the sound speed may vary, the standing waves (cavity resonance) may change, and a feedback circuit for automatically varying the frequency to maintain the cavity at resonance is beneficial. Although the bubbles have been moved to a smaller region near the wall, the sound beam must pass through this layer of bubbles unless the symmetry of the pipe is altered, as will be described hereinbelow.

FIG. 19a is a schematic representation of a method using acoustic radiation pressure generated from a cylindrical piezoelectric tube at the breathing mode frequency of the tube for moving the bubbles entrained in the water/petroleum mixture such that the cavity resonance shifts. Shown is cylindrical piezoelectric transducer, 42, through which gas-liquid 20 is flowing, and to which an oscillatory electrical signal is applied. Bubbles move toward the wall of the cylinder in response thereto, separating into a liquid free of bubbles and a liquid containing a higher concentration of bubbles.

Figure 19B:
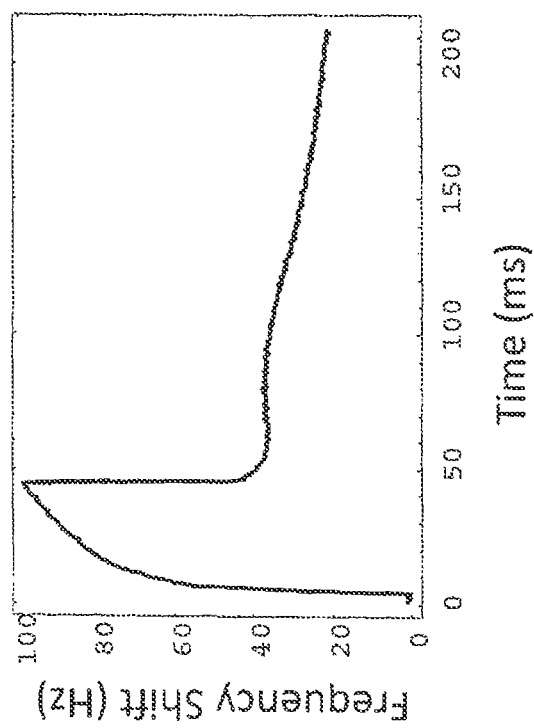
FIG. 19b is a graph illustrating the magnitude of the frequency shift for bubbles as a function of time following the application of the excitation to the piezoelectric tube.

As stated hereinabove, movement of bubbles from their normal distributed position to a more concentrated region due to acoustic pressure shifts the cavity resonance frequency in a proportional manner to the volume of the bubbles. This effect for solid particle concentration is discussed in "Resonator frequency shift due to ultrasonically induced microparticle migration in an aqueous suspension: Observations and model for the maximum frequency shift," by Christopher S. Kwiatkowski et al., J. Acoust. Soc. Am. 103 (6), 3290 (1998). For the case of bubbles, the direction of the frequency shift (positive as compared to negative) is found to be the case as shown in FIG. 19b. This effect of time-dependence of frequency shift provides a diagnostic for achieving proper movement of the bubbles to a desired location when the movement cannot be observed through a metal pipe by other means. The electrical power that is used to move the bubbles may provide a measure of the volume of the total gas moved, and thus a measure of the GVF. Besides the direction of the frequency shift, the same methodology applies for bubble volume determination as presented by Kwiatkowski et al., supra. The volume measurement requires periodically turning off the power when the bubble cloud disperses and the frequency shift decays. This decay time constant is needed for the determination of bubble volume as this is related to viscous drag of bubbles through the host fluid that depends on bubble size. Therefore, this technique provides another measure of gas volume fraction measurement. A function generator may be used to drive a power amplifier to excite the cavity resonance using a transducer attached to the pipe section. This function generator output is turned on and off periodically (every few seconds) to make a measurement of the frequency shift decay once the data are digitized with the circuitry shown previously. The electrical impedance of the transducer may be monitored to determine the resonance condition, the impedance becoming a minimum at resonance, and serves as a feedback signal for automatically maintaining the resonance condition. The output of the feedback signal is also the frequency shift signal mentioned hereinabove.

Figure 20:
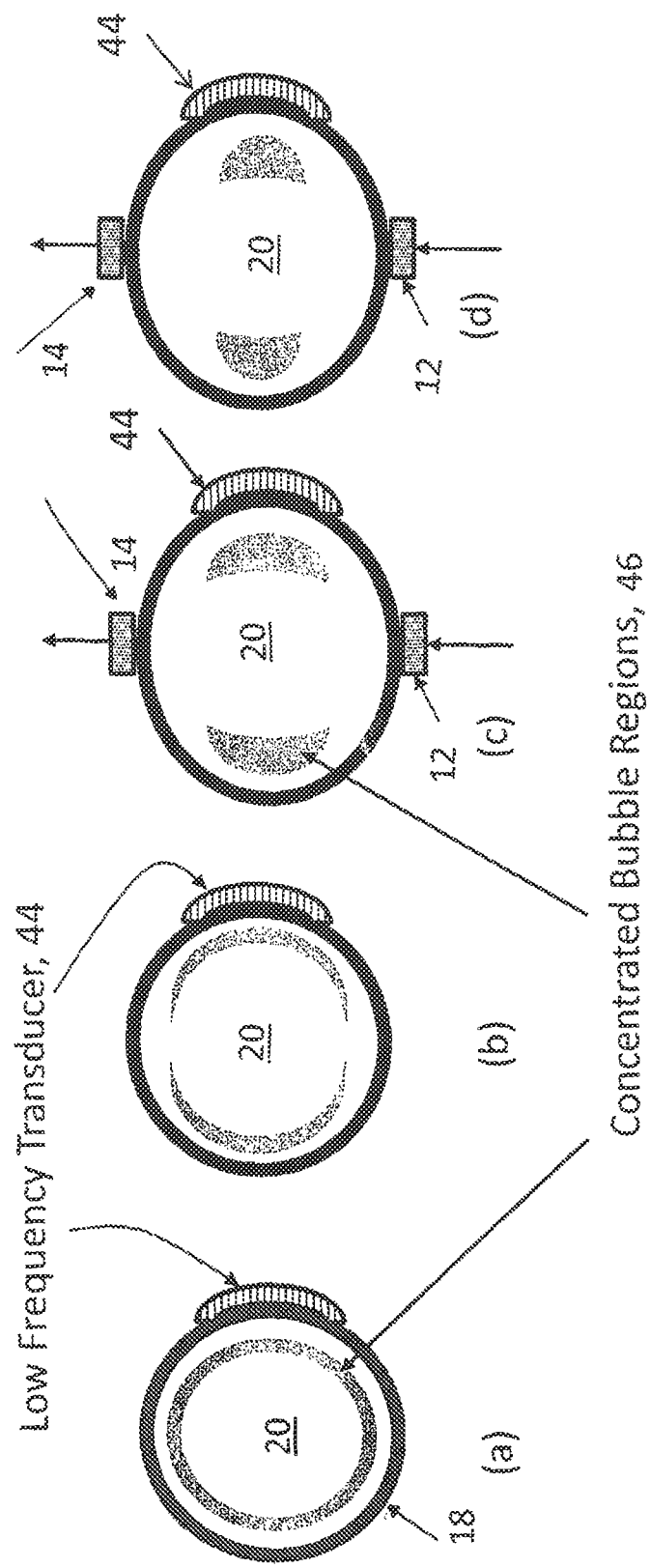
FIG. 20 is a schematic representation of the manner in which ellipticity of a pipe breaks the symmetry thereof and affects the standing waves and the resulting bubble concentration in certain areas, leaving a path for sound transmission measurements through the liquid free of bubbles.

Kaduchak and Sinha in U.S. Pat. No. 6,644,118 show that by breaking the symmetry of a circular cavity (e.g., a circular pipe), it is possible to change the standing wave pattern inside the cavity. Essentially, this involves making the pipe slightly elliptical (oval) in shape. FIG. 20 shows how the ellipticity affects the standing waves and the resulting bubble concentration. Shown is low-frequency transducer, 44, to which an oscillatory voltage having an appropriate frequency is applied attached to pipe 18 through which a bubbly fluid 20 flows. An effective frequency can be obtained either through finite element modeling or through experimentation. When pipe 18 is cylindrical, view (a), generated concentrated bubble region, 46, is cylindrical. As pipe 18 is made more elliptical, views (b) to (d), the bubble concentrations 46 separate. It is seen in views (c) and (d) that the distortion of the pipe geometry provides a situation where the there is an opening in the middle through which a sound beam generated and received by high-frequency transducers 12 and 14, respectively, can pass through the fluid uninterrupted by bubbles. The entire pipe need not be distorted to achieve the effect, but just a small region. FIG. 20 also shows the cross section where transducers 12 and 14 are located on diagonally opposite positions. The effect on the movement of the bubbles is essentially continuous, as has been observed in mineral oil. To lower power consumption, the residence time can be increased by lengthening the region of the pipe that is made slightly oval (less than or equal to about 5% eccentricity for most applications). This measurement can be made in conjunction with the previous measurement for gas volume, or at a slightly different location.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for determining the composition of an oil-water mixture in a gas bubble-water-oil mixture in a pipe or other container having a wall with an inner surface defining a cavity, comprising the steps of:
    applying pulsed oscillatory acoustic energy to the wall of the pipe or container such that an acoustic pulse is transmitted along a path through the mixture, and wherein the lowest frequency of the oscillatory acoustic energy in the gas-water-oil mixture is greater than 500 kHz;
    moving the gas bubbles out of the path of transmission of the acoustic pulse transmitted through the mixture;
    receiving pulsed acoustic energy arriving at the wall of the pipe or container; and
    measuring the time of flight of the pulsed acoustic energy through the mixture from which sound speed of the pulsed acoustic energy is determined;
    whereby the composition of the oil-water mixture is calculated.

2. The method of claim 1, wherein said step of measuring the time of flight of the pulsed acoustic energy comprises a cross-correlation measurement.

3. The method of claim 1, further comprising the step of obtaining the density of the oil as a function of temperature.

4. The method of claim 1, further comprising the step of obtaining the density of the water as a function of temperature.

5. The method of claim 1, wherein said step of moving bubbles out of the path of transmission of the acoustic pulse is achieved by generating annular acoustic standing waves in the pipe or container, whereby an accompanying acoustic force moves the bubbles out of the transmission path of the acoustic pulse.

6. The method of claim 1, wherein the gas-water-oil mixture is moving through the cavity of the pipe or container.

7. The method of claim 1, wherein the pulsed oscillatory acoustic energy is chosen from a frequency chirp and a tone burst, having a chosen frequency range.

8. The method of claim 7, wherein the chosen frequency range is between 500 kHz and 5 MHz.

* * * * *